Patented June 21, 1927.

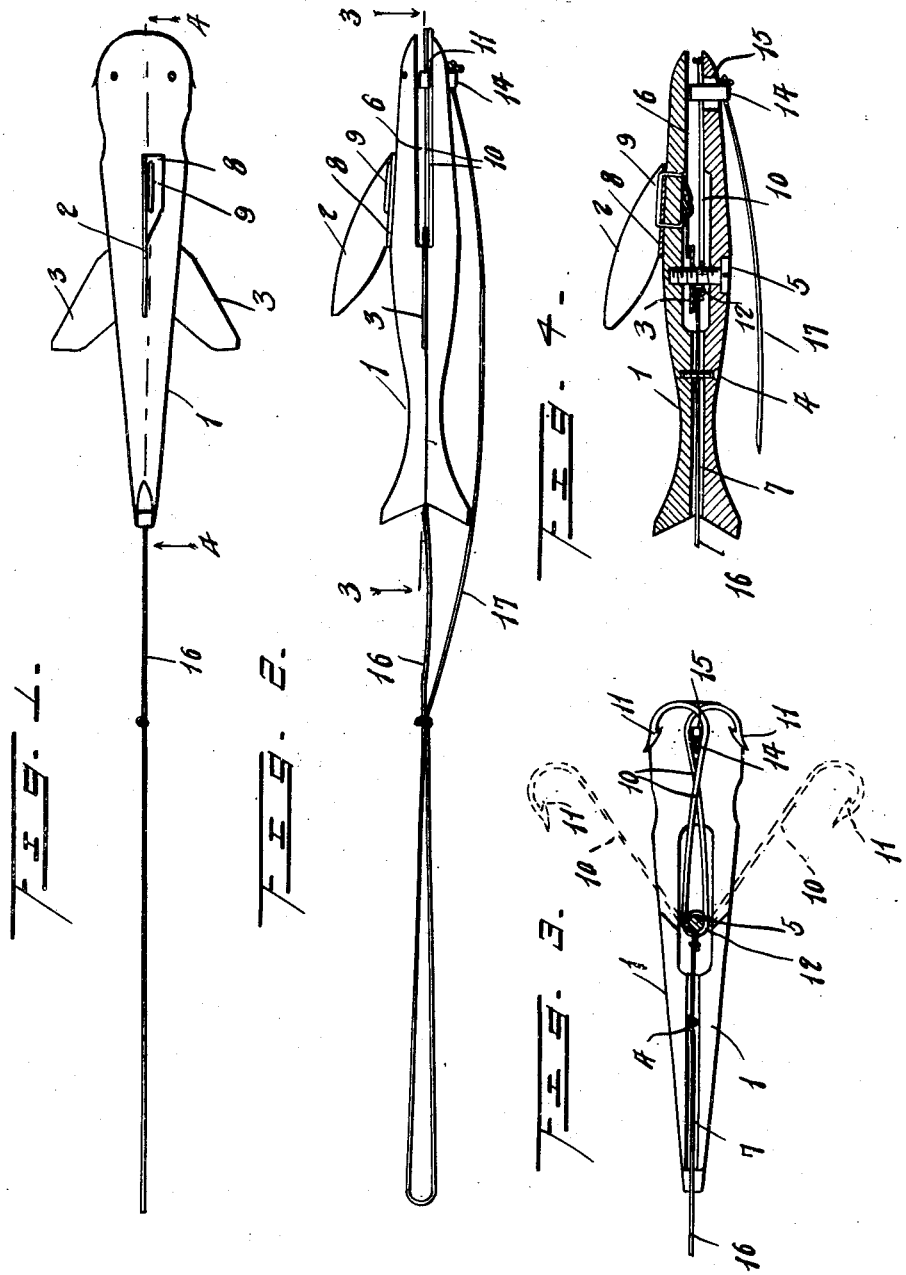

1,633,419

UNITED STATES PATENT OFFICE.

CHARLES M. REED, OF KABLETOWN, WEST VIRGINIA.

ARTIFICIAL-MINNOW FISHHOOK.

Application filed November 26, 1926. Serial No. 150,936.

This invention relates to artificial baits used in angling and embodying an artificial minnow and hooks connected to the minnow.

The invention has for one of its objects to provide an artificial bait of this character which shall be especially adapted for use in angling for bass and wherein the hooks shall be normally arranged or housed within the minnow and adapted to spring therefrom into engagement with the mouth of the fish striking the head of the minnow.

A further object of the invention is to provide an artificial bait of the character stated wherein the hooks shall be of the spring type and under tension when arranged or housed within the minnow, which shall include a member removably carried by the minnow and engaging the hooks to retain the latter within the former, and which shall embody means adapted to effect the withdrawal of the member when a fish strikes the minnow and thus release the hooks for movement into engagement with the mouth of the fish.

With the foregoing and other objects in view, the nature of which will become apparent as the description proceeds, the invention consists of the novel construction, combination and arrangement of parts hereinafter fully described and claimed, and illustrated in the accompanying drawing, wherein:

Figure 1 is a top plan view of an artificial bait embodying my invention,

Figure 2 is a view in side elevation of the artificial bait,

Figure 3 is a sectional view taken on the horizontal plane indicated by the line 3—3 of Figure 2, and Figure 4 is a sectional view taken on the vertical plane indicated by the line 4—4 of Figure 1.

The artificial minnow 1 which has a back fin 2 and side fins 3, is made of hard wood or other suitable material and is preferably coated with paint of the color of silver. It is made of two similar sections which are secured together by screws 4 and 5, and is provided with a longitudinal slot 6 and a longitudinal passage 7. The slot 6 opens out through the head and sides of the minnow 1, and the passage 7 opens out through the tail of the minnow and communicates at its front end with the rear end of the slot. The back fin 2 is made of light metal, and is provided with a flange 8 through the medium of which it is secured to the minnow 1 by an element 9. The side fins 3 which are made of a single piece of light metal, pass through the slot 6, and are secured in place by the screw 5.

The hooks 10 which are made from a single length of resilient material and provided with barbs 11, are twisted at their point of connection to provide a spring loop 12. The hooks 10 are pivotally connected to the minnow 1 at a point near the rear end of the slot 6 by the screw 5 which passes through the spring loop 12. The hooks 10 are adapted to be held within the slot 6, as shown by dotted lines in Figure 1. When the hooks 10 are in this their inactive position, the spring loop 12 is under tension, with the result that when the hooks are released they are forced outwardly from the slot 6 into their active position, as shown by dotted lines in Figure 3.

When preparing the bait for use, the hooks 10 are forced wholly within the slot 6, and when they are in this position, their shanks are arranged in crossed relation, as shown by solid lines in Figure 3. The hooks 10 are adapted to be held in inactive position by a pin or keeper 14 which is located between the crossed shanks of the hooks and passes through an opening 15 which is formed in the under side of the head of the minnow 1 and communicates with the slot 6. The main line 16 extends through the passage 7 and is secured to the spring loop 12, and a trip line 17 is secured at its rear end to the main line and at its front end to the pin or keeper 14. The main line 16 is slack from the point of connection therewith of the trip line 17 to the spring loop 12, and the trip line 17 is taut, whereby to effect the withdrawal of the pin or keeper 14 when a bass takes the head of the minnow 1. When the pin or keeper 14 is withdrawn, the hooks 10 are released, and when released they will be forced into their active position by the spring loop 12. The hooks 10 will during their movement from inactive to active position engage the opposite sides of the mouth of the bass in such a manner as to positively prevent it from freeing itself. By gently pulling the main line 16, driving movements are imparted to the minnow 1, such movements attracting the attention of bass.

It should be understood that the drawing is merely illustrative and does not pretend to give exact proportions. Furthermore, the said drawing is illustrative of a preferred construction, it being my expectation that various changes and modifications may be made without departing from the spirit and scope of my invention.

What is claimed is:—

1. An artificial bait comprising a minnow, hooks adapted to occupy an inactive position within the minnow, retractable means for holding the hooks in said position, a main line secured to the minnow, a trip line secured to the main line and the means, and means adapted to move the hooks into active position beyond the minnow on the retraction of said first means.

2. An artificial bait comprising a minnow provided with a slot opening out through the sides thereof, hooks arranged within the slot and connected by a spring loop, a retaining element carried by the minnow and passing through the loop, and retractable means for holding the hooks within the slot, said loop being adapted to project the hooks beyond the minnow on the retraction of said means.

3. An artificial bait comprising a minnow provided with a slot opening out through the sides thereof, an element passing across the slot, hooks connected by a spring loop engaged by said element, retractable means for holding the hooks in an inactive position within the slot, and means for effecting the retraction of said first named means when a fish strikes the head of the bait.

4. An artificial bait comprising a minnow provided with a slot opening out through the sides thereof, hooks arranged within the slot and adapted to occupy an inactive position within the minnow with their shanks in crossed relation, a retractable keeper carried by the minnow and positioned between the crossed shanks of the hooks, means adapted to retract the keeper, and means adapted to move the hooks into active position beyond the minnow on the retraction of the keeper.

5. An artificial bait comprising a minnow provided with a slot opening out through the sides thereof, an element within the slot, hooks arranged within the slot and connected by a spring loop engaged with the element, the hooks being adapted to occupy an inactive position within the minnow with their shanks in crossed relation and the spring loop under tension, a retractable keeper carried by the minnow and positioned between the crossed shanks of the hooks, and means adapted to retract the keeper, the spring loop being adapted to project the hooks beyond the minnow on the retraction of the keeper.

In testimony whereof I affix my signature.

CHARLES M. REED.